July 9, 1968  E. B. NEITZEL  3,392,370
GAIN CONTROL CIRCUIT USING DIGITAL CONTROL SIGNALS
Filed Oct. 24, 1965  7 Sheets-Sheet 1

INVENTOR
Edwin B. Neitzel
BY
James O. Dixon
ATTORNEY

July 9, 1968 — E. B. NEITZEL — 3,392,370
GAIN CONTROL CIRCUIT USING DIGITAL CONTROL SIGNALS
Filed Oct. 24, 1965 — 7 Sheets-Sheet 4

INVENTOR
Edwin B. Neitzel
BY
James O. Dixon
ATTORNEY

July 9, 1968  E. B. NEITZEL  3,392,370
GAIN CONTROL CIRCUIT USING DIGITAL CONTROL SIGNALS
Filed Oct. 24, 1965  7 Sheets-Sheet 5
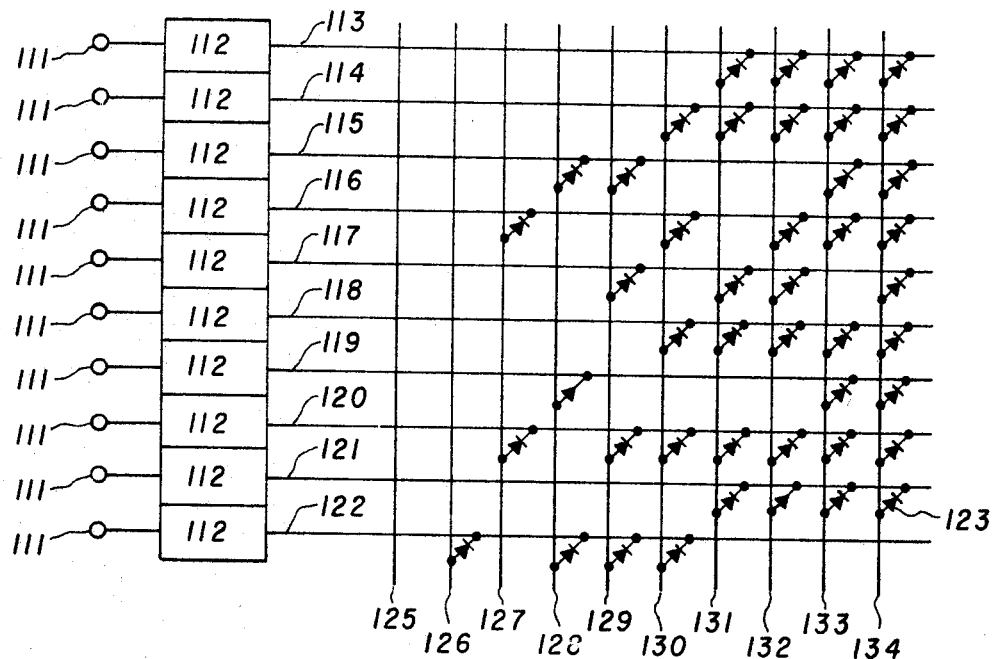
Fig. 6
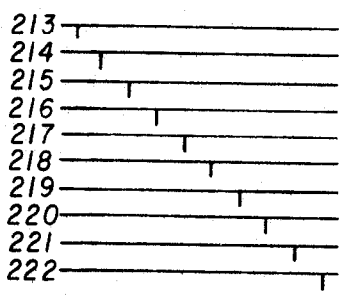
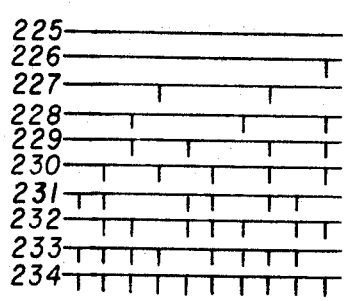
Fig. 7
TIME
INVENTOR
Edwin B. Neitzel
BY James O. Dixon
ATTORNEY

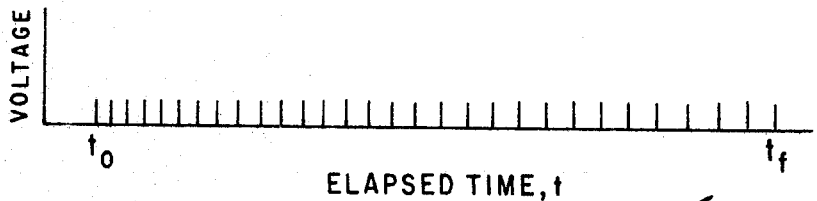
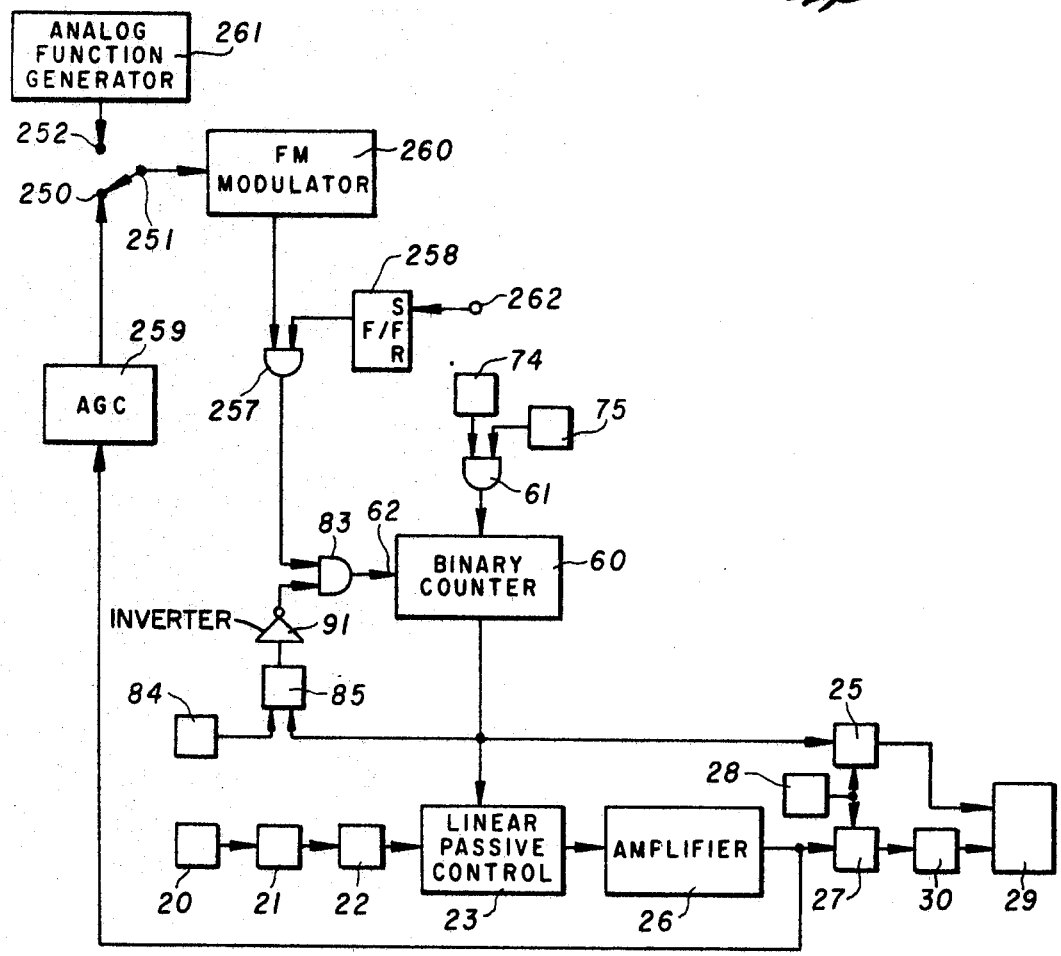

United States Patent Office 3,392,370
Patented July 9, 1968

1

3,392,370
GAIN CONTROL CIRCUIT USING DIGITAL
CONTROL SIGNALS
Edwin B. Neitzel, Dallas, Tex., assignor to Texas Instruments Incorporated, Dallas, Tex., a corporation of Delaware
Filed Oct. 24, 1965, Ser. No. 504,785
5 Claims. (Cl. 340—15.5)

ABSTRACT OF THE DISCLOSURE

An apparatus is disclosed for amplifying a seismic type signal, wherein the gain of the amplifying apparatus is controlled by digital control signals, and in which the gain may be varied automatically either according to a predetermined gain profile or according to a condition at the output of the amplifying apparatus.

This invention relates to a gain control circuit and more particularly to a circuit for controlling gain in a signal processing channel in accordance with digital control signals.

It is an object of the invention to provide a circuit for controlling the gain of a signal processing channel in response to digital signals.

Another object is to provide for the recording of digital signals which accurately reflect the gain produced in a signal processing channel.

It is a further object of the invention to provide a circuit for controlling the gain of a seismic signal processing channel in response to digital signals and for recording digital signals which accurately reflect the gain produced in the processing channel.

In accordance with one aspect of the invention, there is provided a seismic gain control circuit which includes a passive, linear network having a seismic signal applied to the input thereof for transmitting said signal to the output thereof with a gain dependent upon digital signals applied at control terminals of the network, a digital function generator for applying digital signals to the control terminals in accordance with a predetermined gain control function, and a recorder to simultaneously record the digital signals and the transmitted seismic signal.

Other objects, features and advantages of the invention will be more readily understood from the following detailed description when read in conjunction with the appended claims and attached drawings in which:

FIGURE 6 is a detailed circuit diagram of the diode matrix shown in FIGURE 5;

FIGURE 7 is a pulse timing diagram illustrating the operation of the diode matrix in FIGURE 6;

FIGURE 8 is a plot of timing pulses utilized in the circuit of FIGURE 5.

FIGURE 9 is a circuit diagram showing another embodiment of the digital command source of FIGURE 1.

2

Figure 1:
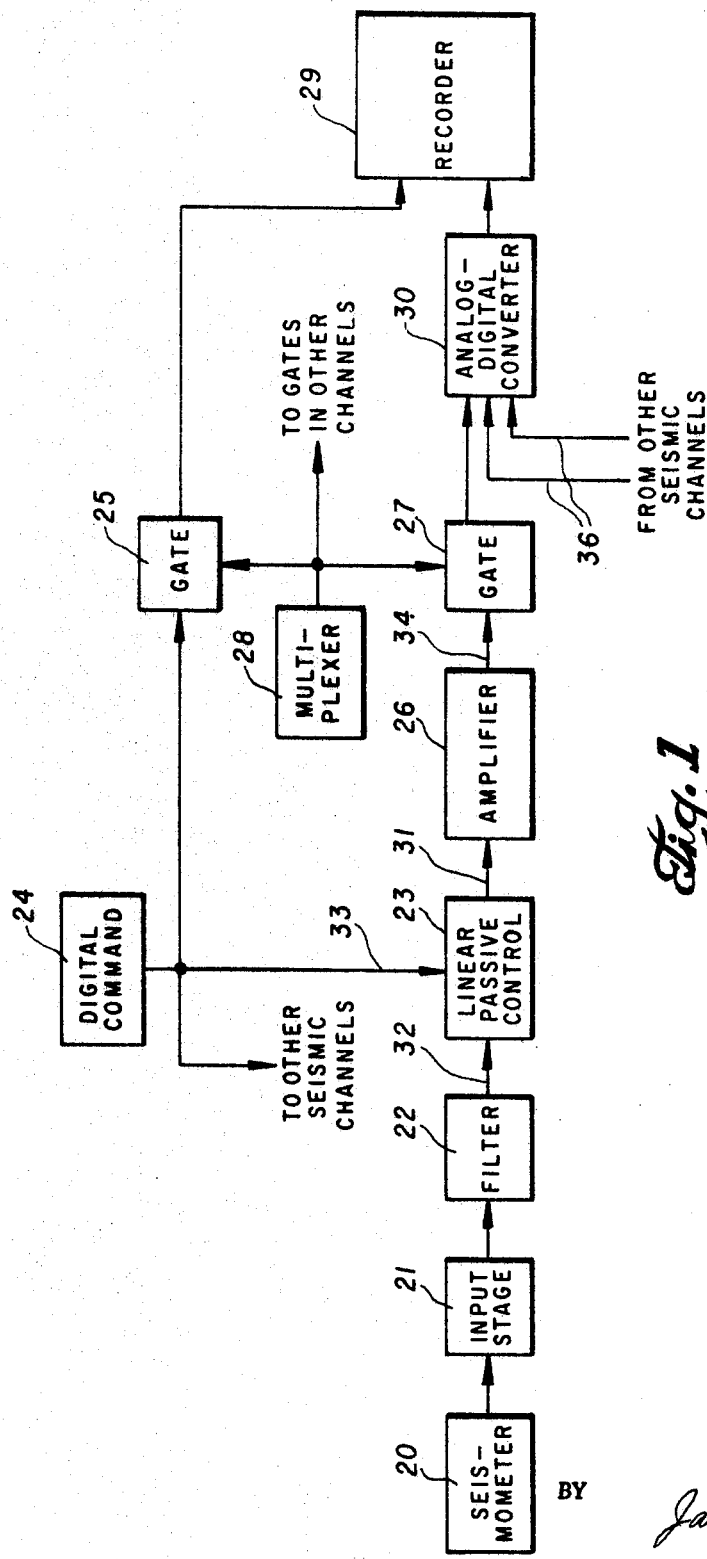
FIGURE 1 is a block diagram of a gain control circuit according to the invention.

Referring now to the various figures, FIGURE 1 illustrates a system for providing digital control of amplifier gain according to the invention. The signal to be processed by the system of FIGURE 1 derives from a seismometer 20, which produces electrical signals in response to vibrations it receives. The output of seismometer 20 is applied to input stage 21, which is merely a constant gain amplifier. The output signal from input stage 21 is filtered by band pass filter 22 to attenuate noise components.

The output signal of filter 22 is processed by linear passive control network 23. The operation of linear passive control network 23, which may be a variable resistive attenuator, is to produce an output signal at output 31, the magnitude of which is related by a selected ratio to the magnitude of the input signal at input 32. The size of the ratio is dictated by digital control signals applied at control 33 from the digital command source 24. The response of control network 23 is linear, which is to say, that the ratio between output and input signal is independent of the magnitude of the input signal to the control network. The gain determining components of control network 23 are passive; that is, the network does not derive its gain characteristics from the gain characteristics of components which require a source of energy, such as transistors. Transistors may, however, be used as switches in network 23. A detailed description of a linear passive control network, such as control network 23, is given below in connection with FIGURE 2. The ratio of output signal to input signal produced by control network 23 will hereinafter be referred to as the "gain" of the network. Although the term "gain" is occasionally used as synonymous with "amplification," it will be used throughout the following description in its broadest sense, which includes both amplification and attenuation.

The time variation in the gain of linear passive control network 23 is dictated by the time variation of the digital control signals produced by digital command source 24. Digital command source 24 represents any of several circuits for generating appropriate digital signals to control the gain of control network 23. Detailed illustrations of such circuits are given below, both for obtaining gain variation according to a predetermined function of time and for obtaining automatic gain control (AGC).

After processing by linear passive control network 23, the seismic signal is amplified by amplifier 26. Amplifier 26, like input stage 21, has a constant gain; that is, ideally, the gain of each amplifier does not vary with respect to time or input signal amplitude. The gain variation of both amplifier 26 and input stage 21 due to changing circuit conditions may be rendered quite small, as a practical matter, by the use of stabilizing negative feedback within the amplifiers, as is well known in the art.

The output of amplifier 26 is applied to the input of gate circuit 27, while the digital control signals from digital command source 24 are applied to the input of gate circuit 25. Gate circuits 25 and 27 are controlled by multiplexer 28. On the receipt of the proper signal from multiplexer 28, gate circuit 25 transmits the digital control signal from digital command source 24 to recorder 29, and gate circuit 27 simultaneously transmits the output of amplifier 26 to analog-to-digital converter 30. The multiplexing system comprising multiplexer 28, gate circuit 25 and gate circuit 27 is the ordinary switching system for connecting a plurality of input channels to a common output channel in sequence, disconnecting one input channel from the common output channel before connecting the next input channel in the sequence to the common output channel. As is common in such seismic systems, the system of FIGURE 1 has associated therewith a number of similar seismometer signal processing channels, not shown, each connected to analog-to-digital converter 30 by a gate circuit like gate circuit 27. The inputs to converter 30 from the other channels are indicated by signal paths 36. Also shown are paths from multiplexer 28 to the gate circuits of other seismic channels and control paths to linear passive control networks in other channels from digital command source 24 which may be used to control the gain therein. After multiplexer 28 has caused gate circuit 27 to connect the output of amplifier 26 to analog-to-digital converter 30, the multiplexer signals the gate circuit for the next seismometer channel in the sequence to connect to converter 30 the output of a corresponding amplifier in that channel. At that time, the appropriate digital control signals from source 24 will be gated to recorder 29. Analog-to-digital converter 30 is of a well known type for producing at the output thereof a digital representation of an analog electrical signal applied to its input. Recorder 29 may be, for example, a magnetic tape recorder. In such a case, the output signal from gate 25 is recorded on one tape recording channel or group of recording channels of recorder 29, while the output of analog-to-digital converter 30 is recorded on another channel or group of channels.

One of the advantages provided by the invention is apparent from the broadly described system of FIGURE 1; namely, the gain control signals for the system from digital command source 24 can be recorded in digital form without the need for analog-to-digital conversion, as is required for recording analog gain control signals. Such a situation provides the advantages of recording a digital signal rather than an analog one, without introducing any error that may be inherent in the analog-to-digital conversion process. The foregoing advantage is obtained, of course, because the gain control signals are in digital form originally. As will be seen from the description of more detailed apparatus, the gain produced by linear passive control networks 23 is accurately related to the digital control signals produced by digital command source 24; hence, the record of gain made by recorder 29 is a highly acurate one.

Figure 2:
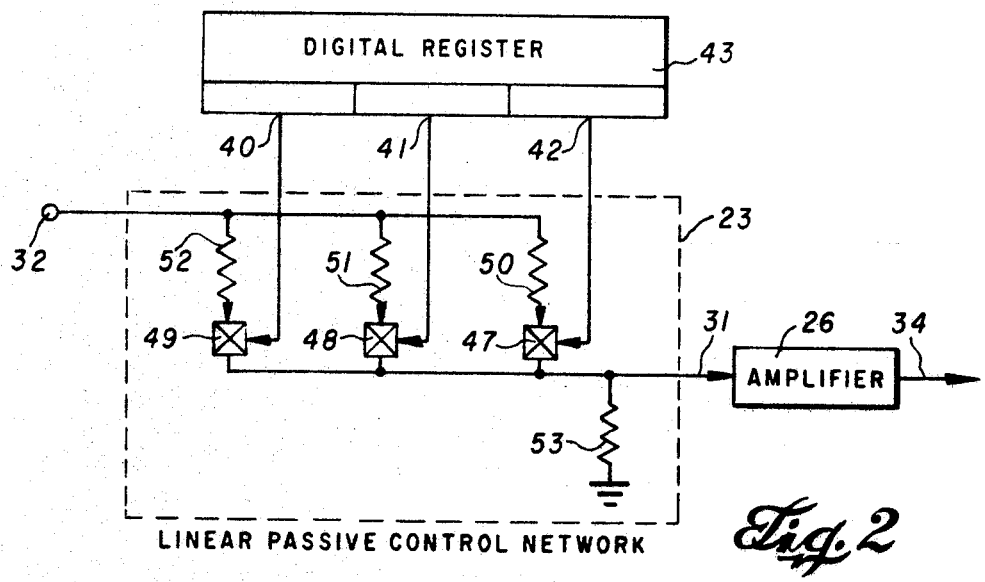
FIGURE 2 is a schematic diagram of a linear passive control network employed in the circuit of FIGURE 1.

FIGURE 2 illustrates one embodiment of the linear passive control network 23 in FIGURE 1. Input terminal 32 corresponds to the output of filter 22 shown in FIGURE 1. As in FIGURE 1, output 31 of control network 23 is applied to the input of constant gain amplifier 26, and output 34 of amplifier 26 is applied to the input of gate 27. The gain of control network 23 from input 32 to output 31 is controlled by digital signals applied to control terminals 40–42 by digital register 43, which register is the output circuit of digital command source 24.

Digital register 43 is illustrated by way of example as registering a digital number expressed by three bits. The bit storage elements of the register may comprise three flip-flops. Each flip-flop represents a certain bit of the three bit word, with the state of each flip-flop indicating whether the corresponding bit is a "1" or a "0." The voltage at each of the terminals 40, 41 and 42 derives from the output voltage of one of the flip-flops. The voltage at, say, terminal 40 is of either positive or negative polarity, depending on whether the corresponding bit is a "1" or a "0," respectively. Of course, the opposite convention may be adopted, considering a negative polarity as a "1."

Switch 49 is of the type which connects resistor 52 to terminal 31 if the voltage at terminal 40 is positive and disconnects said resistor from terminal 31 if the voltage at terminal 40 is negative. Switches 47 and 48 operate in similar fashion. The functions of switches 47–48 may be performed by well-known multiplexing switches, as for example, the transistor switch described in U.S. Patent No. 2,962,603 issued Nov. 29, 1960, to R. L. Bright. All of the resistors 50–52, each of which is in series with a conducting switch are connected in parallel, and the parallel combination of resistors is connected in series with resistor 53. Since the input terminals 31 of amplifier 26 is connected to the non-grounded terminal of resistor 53, resistors 50–52 and resistor 53 essentially form a variable voltage divider.

For an illustration of the manner in which resistors 50–52 are selected, it may be assumed that the bit represented by the voltage on terminal 40 is the most significant bit of the number stored in register 43, that represented by terminal 41 being the next most significant, and so forth. Resistor 53 is made small with respect to resistors 50–52. Then, if the value of resistor 51 is made twice that of resistor 52 and the value of resistor 50 is twice the value of resistor 51, the gain from terminal 32 to terminal 31 will be directly proportional to the value of the binary number stored in digital register 43. Thus, if terminal 42 is the only positive terminal of the three (corresponding to the binary number "001"), a certain fraction of the voltage at terminal 32 will be produced at terminal 31 by the voltage divider composed of resistors 50 and 53; whereas, if terminal 41 becomes the only positive terminal (corresponding to "010"), the current in resistor 51 will be subtantially twice that which flows in resistor 50, producing at terminal 31 a fraction equal to twice said certain fraction. If both terminals 41 and 42 are positive (corresponding to "011"), the fraction at treminal 31 will be appropriately three times said certain fraction. It is apparent that the circuit of FIGURE 2 may be expanded to respond to a greater number of bits, thereby increasing the fineness of gain control. For example, a 14-bit network would provide 16,384 possible values of gain.

The linear passive control network 23 of FIGURE 2 produces an accurate and highly reproducible gain in response to the digitally represented number stored in register 43. The passive components of the control network are relatively immune to the effects of age. The response of the network is highly linear over a wide range of numbers appearing in register 43. One of the important features of the circuit of FIGURE 2 is that a record of the numbers stored in register 43, such as is made by recorder 29 of FIGURE 1, provides an accurate, digital expression of the actual gain produced by network 23.

Figure 3:
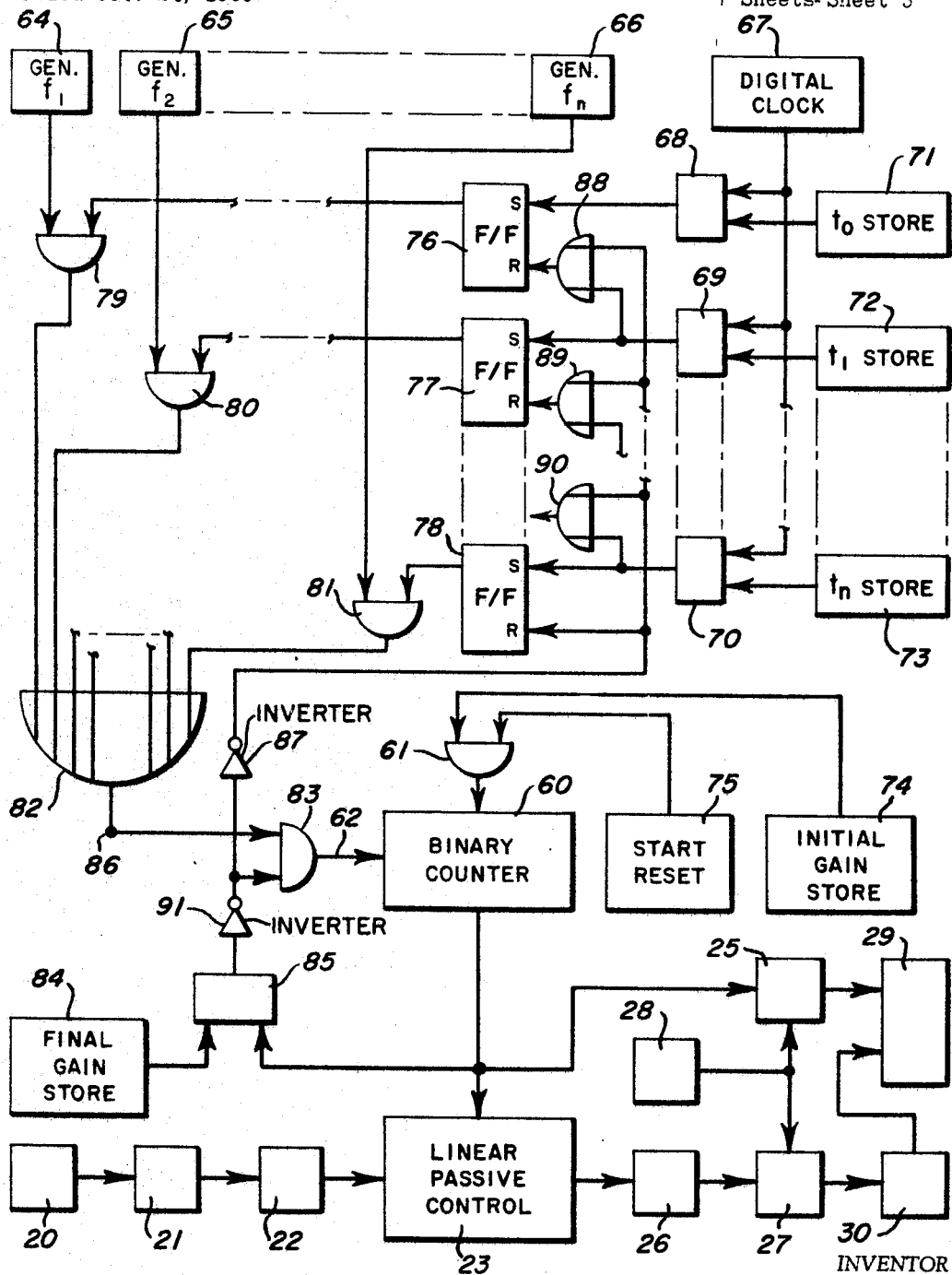
FIGURE 3 is a further illustration of the circuit in FIGURE 1, showing in detail an embodiment of the digital command source of FIGURE 1.

FIGURE 3 illustrates a system of the type shown in FIGURE 1, wherein the gain of linear passive control network 23 is made to vary according to a predetermined function of time. The linear passive control network 23, shown as a block in FIGURE 3, is of the type shown in FIGURE 2. Accordingly, much of the circuitry shown in FIGURE 3 corresponds to digital command source 24 of FIGURE 1, being for the purpose of generating digital gain control signals for application to control network 23, which signals vary with time so as to produce the predetermined variation of gain in network 23. Seismometer 20, input stage 21, filter 22, constant gain amplifier 26, gates 25 and 27, multiplexer 28, recorder 29, and analog-to-digital converter 30 correspond to like elements in FIGURE 1.

In the system of FIGURE 3, the digital register which corresponds to the digital register 43 of FIGURE 2, is an output digital register included in the block labeled binary counter 60. Binary counter 60 counts the number of times that the voltage at the input 62 thereof passes into a predetermined range of voltage values. Such a counter is commonly used to count pulses, and such is the use here. The number of pulses counted by counter 60 is registered in the output register thereof (register 43 of FIGURE 2). The output terminals of the digital register are connected to control network 23, in the manner set forth in connection with FIGURE 2, so that the gain produced by control network 23 is directly proportional to the number in the output digital register of binary counter 60, and hence directly proportional to the number of pulses counted by counter 60. Thus, pulses must be provided at input 62 of binary counter 60 at such times that the binary number in the output digital register will follow the predetermined function of time.

Figure 4:
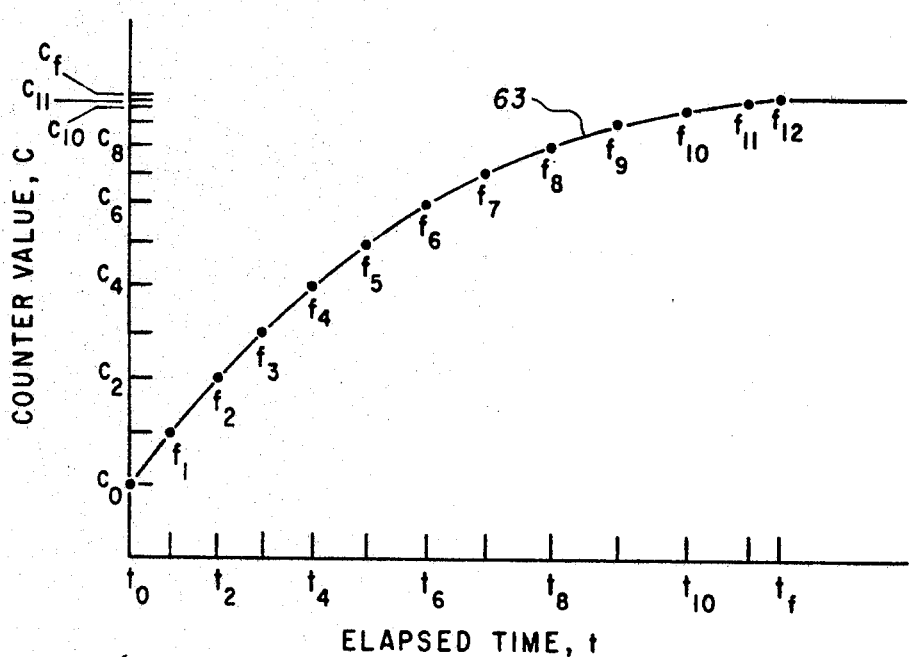
FIGURE 4 is a graph illustrating the generation of a gain control function in accordance with the invention.

FIGURE 4 illustrates a gain function that may be produced by the circuit of FIGURE 3. It is assumed that the smooth curve 63 therein is considered a suitable gain function for processing seismometer signals from a particular locale. The gain function can be plotted in terms of the value registered by binary counter 60 rather than gain, since the gain of control network 23 is proportional to the counter value. The gain control function produced by the system of FIGURE 3 approximates that given by curve 63. Broadly, the approximation is obtained as follows. Means are provided to set the counter value at $c_0$, the initial value of curve 63, and pulses are applied to counter 60 at such a rate $f_1$ that the counter value at a time $t_1$ will equal $c_1$, a second value on curve 63. Then pulses are applied to the counter at a different, lower rate $f_2$, such that the counter value at time $t_2$ will be $c_2$, a third value on curve 63. The process is continued until the counter reaches the highest value on curve 63, at which time no more pulses are applied thereto. This method is carried out in the system of FIGURE 3 by applying to input 62 of binary counter 60 the outputs of pulse generators 64–66, sequentially switching from one generator to the next at times $t_1$, $t_2$, etc. Practically, such a scheme requires that linear passive control network 23 have a greater number of resistance branches than the three resistors 50–52 illustrated in FIGURE 2, and that the output digital register of counter 60 have a correspondingly greater bit capacity.

The initial counter value $c_0$ is established in the system of FIGURE 3 by initial gain storage register 74, a circuit like digital register 43. Storage register 74 is connected to AND circuit 61, which upon actuation applies the contents of register 74 to binary counter 60 in such a way that the contents of the output digital register of the counter are replaced by the contents of storage register 74. Start-reset unit 75 is the source of a signal, manually or automatically applied to AND circuit 61, to transfer the number in storage register 74 to the output register of counter 60. The number to be registered by initial gain storage register 74 may be selected by manual programing switches triggering the flip-flops thereof, as is the case for the other digital storage registers shown herein.

The time reference source for the generation of a gain function using pulse generators 64–66 is digital clock 67. Digital clock 67 delivers to digital comparator circuits 68–70 an elapsed time signal expressed as a number represented in digital form. Although only one signal path is shown emanating from digital clock 67, the digital signal produced thereby is in parallel form; that is, like the output of binary counter 60, the signals representing the bits of a number occur simultaneously on multiple conductors, rather than in sequence on a single pair of conductors. Such a digital clock may be, for example, a binary counter, like counter 60, counting the output signals of a highly accurate oscillator. The operation of digital clock 67 is initiated by apparatus not shown to be synchronized with some seismological event, such as the seismic shot.

Storage registers 71–73 are registers like initial gain storage register 74. Stored in registers 71–73 are digital representations of the times for switching from one of pulse generators 64–66 to the next generator. Each number stored in one of the registers 71–73 is applied to one of digital comparators 68–70 in parallel form, along with the output of digital clock 67. Each of digital comparators 68–70 is of the type which produces an output when the output of digital clock 67 is the same as the time value stored in the one of registers 71–73 applied at an input thereof. The output of digital comparator 68 is applied to the S input of the first flip-flop 76. Otherwise, each of digital comparators 69–70 has the output thereof connected to the S input of a corresponding one of flip-flops 77–78 and to the R input of the next preceding flip-flop through one of the OR circuits 88–90. Thus, the output of digital comparator 69 is applied to the S input of flip-flop 77 and the R input of flip-flop 76 through OR circuit 88. The output of each of flip-flops 76–78 is connected to one input of one of the AND circuits 79–81, along with the output of one of the pulse generators 64–66, which have pulse repetition frequencies of $f_1$, $f_2$ ... $f_n$, respectively. The outputs of all the AND circuits 79–81 are connected to the inputs of OR circuit 82, the output of which is terminal 86.

When the digital number produced by digital clock 67 is the same as the number stored in the storage register 71, corresponding to time $t_0$, digital comparator 68 produces an output causing flip-flop 76 to produce an output. The output signal from flip-flop 76, when applied to the input of AND circuit 79 causes the output of pulse generator 64 to be applied to OR circuit 82. Thus, a train of pulses having a repetition frequency $f_1$ appears at output terminal 86 of OR circuit 82. When the output of digital clock 67 reaches $t_1$, digital comparator 69 produces an output which is applied to the S input of flip-flop 77 and to the R input of flip-flop 76. The input to flip-flop 76 from digital comparator 69 causes flip-flop 76 to produce no output, thereby causing AND circuit 79 to cease transmitting pulses from generator 64. The input to flip-flop 77 from digital comparator 69 causes flip-flop 77 to produce an output, thereby actuating AND circuit 80 to transmit the pulses from generator 65 to OR circuit 82. Hence, the repetition frequency of the pulses appearing at output terminal 86 changes from $f_1$ to $f_2$.

The highest counter value on curve 63, $c_f$, is stored in final gain storage register 84, a register like storage register 74. The output of storage register 84 is connected along with the digital output of binary counter 60 to the input of a digital comparator 85 which produces an output signal when the two binary numbers at its inputs are the same. Inverter 91 produces an output when comparator 85 produces no output. Hence, for the first portion of the operation of the system in FIGURE 3, inverter 91 applies a signal to one input of AND circuit 83, thereby passing the pulses at terminal 86 to the input 62 of binary counter 60. After the counter value reaches the number stored in final gain storage register 84, inverter 91 produces no output, which event blocks the transmission of signals from terminal 86 to input 62 of counter 60. Since counter 60 ceases receiving pulses, the counter value remains at $c_f$ and comparator 85 and inverter 91 maintain AND circuit 83 closed to pulses from terminal 86. When inverter 91 produces no output, inverter 87 connected to its output terminal applies an output to the R inputs of flip-flops 76–78 by means of OR circuits 88–90, thereby deactivating AND circuits 79–81.

The described operation of the system of FIGURE 3 illustrates a novel feature of the invention. The digital gain control signals applied to control network 23 are generated in accordance with a predetermined gain function, without recourse to analog function generating techniques, as are used in prior art gain control systems. In general, the use of the digital function generation results in improved accuracy and flexibility.

Figure 5:
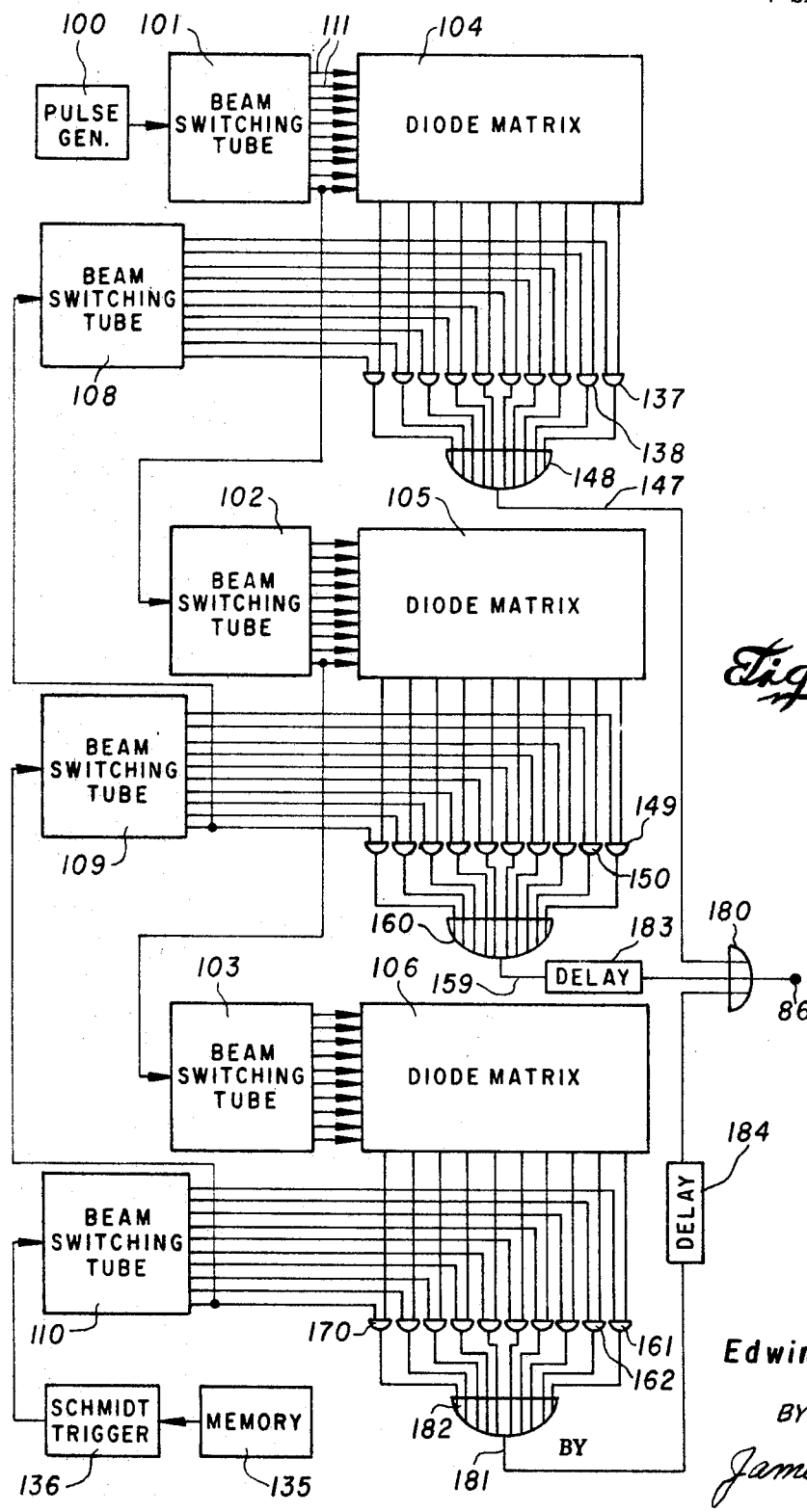
FIGURE 5 illustrates another embodiment of the digital command source of FIGURE 1.

FIGURE 5 illustrates an alternate circuit for producing the train of pulses which causes binary counter 60 (FIGURE 3) and linear passive control network 23 to generate the predetermined gain control function. Accordingly, output terminal 86 of FIGURE 5 corresponds to terminal 86 in FIGURE 3, said terminal in FIGURE 3 being connected by means of AND circuit 83 to the input 62 of binary counter 60. In the apparatus of FIGURE 5, there is but one pulse generator 100, rather than a number of generators like generators 64–66 in FIGURE 3. The pulses produced by generator 100, having a fixed pulse repetition frequency, are passed through a chain of frequency dividers comprised of scale of ten counters such as magnetron beam switching tubes 101, 102 and 103, and of diode matrices 104, 105 and 106.

The amount by which the frequency of generator 100 is divided by the frequency dividing unit is controllable by means of a slope change register counter comprised of magnetron beam switching tubes 108, 109 and 110. Timing pulses applied to said slope change register counter by memory 135 produce a variation with time of the amount of frequency division, according to the predetermined gain control function. The resulting output at terminal 86 is a succession of pulses, divided into groups the frequencies of which vary in accordance with the predetermined gain function. Thus, the circuit of FIGURE 5 produces the result given by the circuit of FIGURE 3, without the use of numerous pulse generators.

The operation of frequency division in the circuit of FIGURE 5 will now be described with reference to FIGURES 5, 6 and 7. Pulse generator 100 produces a train of pulses at a fixed pulse repetition frequency, $f$. Magnetron beam switching tube 101, which is response to the pulses produced by generator 100, has associated therewith the circuitry necessary to switch the electron beam of the tube from one of the anodes 111 thereof to the next succeeding anode upon the receipt of a pulse from generator 100. As shown in FIGURE 6, the outputs from anodes 111 are applied to the inputs of pulse forming networks 112, which produce a pulse at the outputs 113–122 thereof when the output of the switching tube 101 switches from one anode 111 to the next. Networks 112 may be ordinary resistor-capacitor differentiation circuits. It is apparent that beam switching tube 101 and pulse forming networks 112 could be replaced by any suitable distribution system, which is capable of converting the serially occurring pulses from generator 100 to pulses sequentially appearing on the multiple output lines 113–122. Examples of circuitry for use with suitable counting tubes, including magnetron beam switching tubes is shown in the magazine Electronic Engineering, volume 26, February 1954, pages 56–62.

FIGURE 6 shows a detailed illustration of diode matrix 104 in FIGURE 5, which is identical to matrices 105 and 106 in said FIGURE 5. In diode matrix 104, ten conductors 113–122 cross ten other conductors 125–134. The two sets of conductors are insulated from each other, except for diode connections such as that made by diode 123. The effect of such a diode arrangement is to allow a negative-going pulse appearing on, say, conductor 122 to be transmitted to conductors 126, and 128–130, but not to conductors 125, 127 and 131–134, since there are no diodes severally connected to said latter conductors.

It can be seen from FIGURE 6 that conductor 134 has a diode connection with nine of the conductors 113–122; whereas, conductor 133 has connections with only eight of the conductors 113–122; conductor 132 has seven connections, and so on, conductor 125 having no connections with the conductors 113–122. The result of such an arrangement is illustrated in FIGURE 7. FIGURE 7 shows the time relationship between the pulses occurring on conductors 113–122 and 125–134. The sequential appearance of pulses on conductors 113–122 produced by the distributing action of switching tube 101 is illustrated by diagrams 213–222 of FIGURE 7, diagram 213 corresponding to conductor 113 and so on. The pulse train appearing at each of the terminals 125–134 as a result of the pulses at conductors 113–122 is shown in each of diagrams 225–234, diagram 225 corresponding to conductor 125 and so on. It is seen in diagram 234, for example, that a sequence of ten pulses on lines 113–122 result in nine pulses from conductor 134. The same sequence results in a train of eight pulses from conductor 133, and seven pulses on conductor 132. Hence, if the pulse repetition frequency of generator 100 is $f$, conductor 134 produces pulses at an average frequency $(9/10)f$, conductor 133 produces pulses at a frequency $(8/10)f$, and so on.

In FIGURE 5, beam switching tubes 108, 109 and 110 select the fraction of the frequency $f$ which is to appear at output terminal 86 by selecting the appropriate output terminals of diode matrices 104–106. The times at which the various frequencies are produced at terminal 86 are controlled by a series of pulses stored in a memory 135, which may be apparatus for deriving pulses recorded on magnetic tape. FIGURE 8 shows the time relationship of pulses such as are produced by memory 135 to approximate a gain curve of the type shown in FIGURE 4. The pulses in FIGURE 8 provide for a greater number of slope changes than shown in FIGURE 4.

The train of pulses from memory 135 is applied to Schmitt trigger circuit 136, which shapes the pulses. The output of Schmitt trigger circuit 136 is applied to the input of magnetron beam switching tube 110, which is like tubes 101–103, 108 and 109.

For illustration of the operation of the circuit of FIGURE 5, it may be assumed appropriate to begin producing pulses at terminal 86 at the highest frequency of which the circuit in FIGURE 5 is capable. In such a situation, beam switching tubes 108–110 are pre-set by circuitry not shown so that the outputs thereof appear on the first anodes thereof, that is, those which actuate AND circuits 137, 149 and 161. Before the application of a pulse to switching tube 110 by Schmitt trigger 136, the operation of the circuit in FIGURE 5 is as follows: For every ten pulses applied by pulse generator 100 to beam switching tube 101, nine pulses appear on conductor 134 of diode matrix 104, which is connected to AND circuit 137. Since beam switching tube 108 has been preset to actuate AND circuit 137, said AND circuit transmits the nine pulses out of ten to OR circuit 148 which transmits to the output 147 thereof signals applied at any of the inputs thereof. Hence, for every ten pulses applied to switching tube 101, nine pulses appear at output 147 and are applied to OR circuit 180. Since OR circuit 180 operates in the same manner as OR circuit 148, said pulse appears at output terminal 86. Likewise, AND circuit 149 is connected in diode matrix 105 to a conductor arranged as conductor 134, and for every ten pulses applied to switching tube 102, nine pulses appear at the output terminal 86. Similarly, for every ten pulses applied to tube 103, nine pulses are transmitted by AND circuit 161 and appear at output terminal 86. The pulses applied to the input of beam switching tube 102 derive from the outputs of tube 101. Beam switching tube 102 includes circuitry which responds to the switching of the beam in tube 101 from the ninth to the tenth anode thereof to pulse tube 102 and switch its output to the next anode. Therefore, there are one tenth as many pulses applied to tube 102 as are applied to tube 101. In like manner, one pulse is applied to tube 103 for every ten applied to tube 102. Thus, prior to a pulse from Schmitt trigger 136, for every one thousand pulses applied to beam switching tube 101, nine hundred pulses appear at terminal 147, one hundred pulses are applied to beam switching tube 102, ninety pulses appear at output terminal 159 of OR circuit 160, ten pulses are applied to switching tube 103, and nine pulses appear at output terminal 181 of OR circuit 182. Time delay circuit 183 is inserted between output terminal 159 and the input of OR circuit 180, so that the pulses applied to OR circuit 180 from OR circuit 160 will not be in time coincidence with any of the pulses applied to OR circuit 180 from OR circuit 148. A second time delay circuit 184, which produces a delay different from that of circuit 183, assures that the pulses produced by OR circuit 182 do not coincide with the pulses from either OR circuit 160 or OR circuit 148. Accordingly, for every one thousand pulses applied by pulse generator 100 to beam switching tube 101, there are applied to the inputs of OR circuit 180, nine hundred, ninety and nine pulses by matrices 104, 105 and 106, respectively. Thus, nine hundred and ninety nine pulses appear at output terminal 86.

Under the circuit conditions assumed above, the first timing pulse applied by Schmitt trigger 136 to switching tube 110 causes the output of said tube to switch to the next anode, so that AND circuit 161 is deactivated and AND circuit 162 is activated. Since AND circuit 162 is connected to an output conductor such as conductor 133 in FIGURE 6, OR circuit 182 now produces eight pulses for every one thousand pulses generated by pulse generator 100. Hence, nine hundred and ninety eight pulses appear at terminal 86 for every one thousand applied to switching tube 101. Upon the receipt of the ninth timing pulse from trigger 136, the output of switching tube 110 switches to the anode activating AND circuit 170. The anode controlling AND circuit 170 is also coupled to the input of beam switching tube 109. The circuitry associated with switching tube 109 is such that when switching tube 110 receives the tenth timing pulse, deactivating AND circuit 170, and activating AND circuit 161, the output of switching tube 109 is switched from one anode to the next so as to activate AND circuit 150. Such activation of AND circuit 150 causes the output at terminal 86 to be nine hundred eighty nine pulses for each one thousand pulses generated by pulse generator 100. Upon the application of the tenth pulse to beam switching tube 109, a pulse is applied to the input of beam switching tube 108, causing AND circuit 138 to be activated, resulting in an output at terminal 86 of eight hundred ninety nine pulses for each one thousand pulses generated by pulse generator 100. It is in this manner that the frequency at terminal 86 can be varied from 999 pulses per one thousand applied by generator 100 down to no pulses, in steps of one pulse per thousand applied. A greater number of frequency division steps may be obtained simply by increasing the number of diode matrices in the circuit of FIGURE 5.

FIGURE 9 illustrates yet another circuit for generating digital gain control signals, including means for generating such signals in accordance with an automatic gain control signal. The operation of the circuit in FIGURE 9 is like that of the circuit in FIGURE 3, except that the signals applied to the input and AND circuit 83 to be counted by binary counter 60 are produced by an FM modulator 260. Automatic gain control circuit 259, connected at its input to the output of amplifier 26, is of the type normally used in AGC circuits for responding to the output of an amplifier and producing therefrom an automatic gain control signal to be applied to a variable gain element. Such circuits ordinarily comprise a rectification circuit followed by a filter to control the rate of gain expansion, as shown in U.S. Patent No. 2,935,697, issued to L. B. McManis. When switch 251 is connected to terminal 250 as shown, the output frequency of modulator 260 is modulated in accordance with the amplitude of the signal produced by AGC circuit 259. The more the output voltage of amplifier 26 falls below a predetermined signal level, the greater is the amplitude of the AGC signal applied to modulator 260, and thus the greater is the frequency produced by modulator 260. The gain function produced in response to the digital signals from binary counter 60 can only be a monotonic function of time, since no provision has been made for reducing the number in the output register of counter 60. If there are provided in the circuits of FIGURES 3 and 9 binary counters capable of counting down as well as up, a gain control function having decreasing portions may be obtained. The counter may be made to commence its down counting operation by the application of a control signal or the application of "0" pulses rather than "1" pulses to the counting input.

The gain of linear passive control network 23 can be made to vary according to a predetermined gain function, rather than AGC by connecting switch 251 to terminal 252, the output terminal of an analog function generator 261. Generator 261 generates a voltage which varies so as to produce the predetermined gain function by modulating FM modulator 260. Flip-flop 258 serves the purpose of applying the output signals from FM modulator 260 to AND circuit 83 by actuating AND circuit 257 upon the application of a start pulse at the S input 262 of flip-flop 258.

It is to be noted that, while the system of FIGURE 9 employs analog circuitry in the generation of digital gain control signals, the digital signals recorded by recorder 29 provide an accurate digital record of the gain function actually produced in control network 23, as in the other embodiments of the invention.

Figure 10:
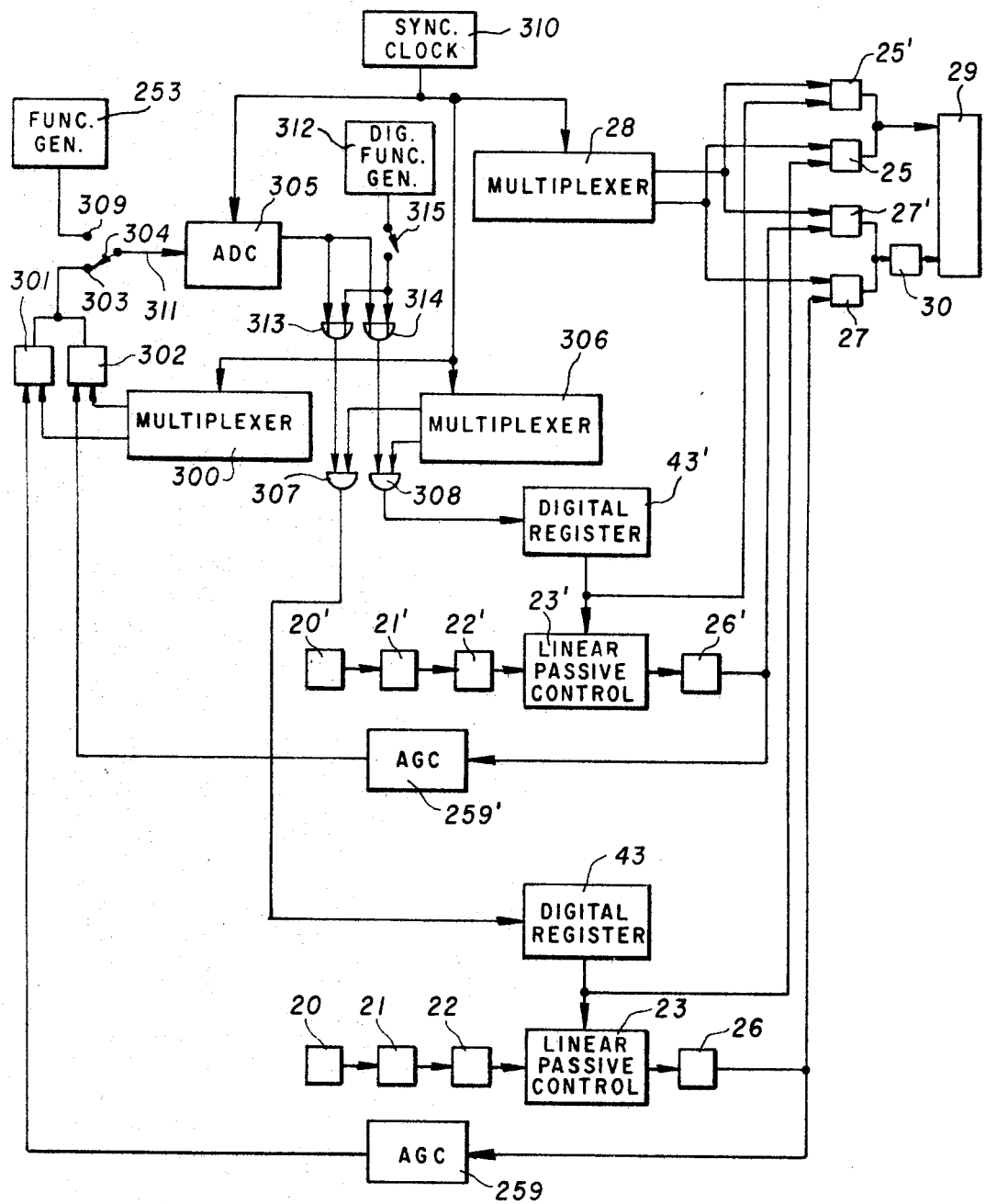
FIGURE 10 is a circuit diagram illustrating an application of the invention to plural seismic channels.

FIGURE 10 illustrates a system in which part of the circuitry for producing digital gain control signals is shared by a plurality of seismic channels. Additionally, there is shown further means for generating the required digital gain control signals. Portions of the circuits which are numbered the same as elements in FIGURE 1 perform the same functions as the like numbered elements of FIGURE 1. Elements having a primed number such as linear passive control network 23' form a second seismic channel, the individual parts of which have the same structure and function as corresponding parts of the channel formed by elements such as passive control network 23.

When switch 304 is connected to terminal 303 as shown, the circuit of FIGURE 10 operates under automatic gain control. The outputs of AGC circuits 259 and 259' are connected to the inputs of gate circuits 301 and 302, respectively. Multiplexer 300, having the outputs thereof connected to the inputs of gate circuits 301 and 302, opens gate circuit 301 during one period and circuit 302 during a different period. Analog-to-digital converter 305 produces at its output a digital representation of the analog voltage appearing at its input 311. The output of analog-to-digital converter 305 is applied to the inputs of AND circuits 307 and 308. Multiplexer 306, having the outputs thereof connected to the inputs of AND circuits 307 and 308, activates AND circuit 307 while gate circuit 301 is open and activates AND circuit 308 while gate circuit 302 is open. Multiplexer 28 having outputs connected to gate circuits 25, 25', 27 and 27' opens gate circuits 25 and 27 while gate circuit 301 is open, and opens gate circuits 25' and 27' while gate circuit 302 is open. Synchronization clock 310 provides synchronization pulses to analog to digital converter 305, and multiplexers 300, 306 and 28 to synchronize the operation thereof.

When switch 304 is connected to terminal 303 as shown, the gains of control networks 23 and 23' are subject to automatic gain control. When gate circuit 301 is open, the output of AGC circuit 259 is applied to the input of analog-to-digital converter 305, which converts to digital form the automatic gain control signal. This digital form is transferred to digital register 43, where it controls the gain of control network 23. Meanwhile, the output of amplifier 26 is converted to digital form and stored on one channel of recorder 29 and the contents of digital register 43 are stored on another channel thereof. When gate circuit 301 is closed and gate circuit 302 is opened, a digital representation of the signal from AGC circuit 259' is transferred to digital register 43'. The output of amplifier 26' is then converted to digital form and stored on the same channel as was the output of amplifier 26, and the number stored in digital register 43 is stored on the same channel as was the number in digital register 43'.

When switch 304 is connected to terminal 309, the operation of the circuit is the same, except that the gain control signal applied to the input of analog-to-digital converter 305 derives from analog function generator 253, rather than AGC circuits 259 and 259'. If switch 304 is disconnected from both terminals 303 and 309, and digital function generator 312 is connected to OR circuits 313 and 314 by switch 315, digital registers 43 and 43' will receive simply the digital function produced by generator 312. Generator 312 is preset to produce at its output, the digital words stored in its memory, in accordance with the time variation of the gain control function. The function of generator 312 in the circuit of FIGURE 10 may also be performed by a prerecorded digital function of time. For example, the inputs of registers 43 and 43' may be connected to the output of a magnetic tape playback, the tape of which has the digital time function recorded thereon. Or the digital function may be recorded on computer programming punch cards.

As in the case of the circuit of FIGURE 9, the apparatus of FIGURE 10, while relying on some analog circuitry to generate digital gain control signals, does provide a digital record of the actual gain of control networks 23 and 23'.

It is to be understood that the above-described embodiments are merely illustrative of the application of the principles of the invention. Numerous other arrangements may be devised by those skilled in the art without departing from the spirit and scope of the invention as defined by the appended claims.

What is claimed is:

1. A circuit for controlling gain in a seismic signal processing channel in accordance with a control function, comprising:
   means for generating said control function,
   attenuation means having input, output and control terminals, and having a seismic signal applied at said input terminals, for transmitting said seismic signal to said output terminals with a gain dependent on digital signals applied to said control terminals,
   counter means for applying to said control terminals digital signals representative of the number of countable input signals applied to said counter means, and
   means for applying countable input signals to said counter means in accordance with said control function,
   wherein said means for applying countable input signals includes means for causing the number of said signals applied to said counter means to be proportional to said control function.

2. A circuit for controlling gain in a seismic signal processing channel in accordance with a control function, comprising:
   means for generating said control function,
   attenuation means having input, output and control terminals, and having a seismic signal applied at said input terminals, for transmitting said seismic signal to said output terminals with a gain dependent on digital signals applied to said control terminals,
   counter means for applying to said control terminals digital signals representative of the number of countable input signals applied to said counter means, and
   means for applying countable input signals to said counter means in accordance with said control function,
   wherein said last mentioned means includes means for generating in accordance with said control function, a sequence of groups of countable input signals, each of said groups being characterized by such a frequency and duration that said control function approximates an ideal smooth gain function.

3. A circuit as set forth in claim 2, wherein said means for generating a sequence of groups of countable input signals comprises:
   plural generating means for producing countable input signals, each generating means being characterized by a different frequency and
   means for applying the output of each generator to said counter means during predetermined time intervals.

4. A circuit as set forth in claim 2, wherein said means for applying a sequence of groups of countable input signals comprises:
   generating means for producing countable input signals at a predetermined frequency,
   plural frequency division means responsive to said generating means to produce countable input signals at a fraction of said predetermined frequency, each division means producing a different frequency, and
   means applied to said frequency division means for controlling the time during which each of said frequency division means has the output thereof connected to said counter means.

5. A circuit for controlling gain in a seismic signal processing channel in accordance with a control function comprising:
   means for generating said control function,
   attenuation means having input, output and control terminals, and having a seismic signal applied at said input terminals, for transmitting said seismic signal to said output terminals with a gain dependent on digital signals applied to said control terminals,
   counter means for applying to said control terminals digital signals representative of the number of countable input signals applied to said counter means, and
   means for applying countable input signals to said counter means in accordance with said control funtion,
   wherein said last mentioned means includes:
      generating means for producing countable input signals at a frequency modulated by an analog signal applied thereto, and
      means for applying to said generating means an analog signal varying in accordance with said control function,
   and wherein said means for applying an analog signal is an automatic gain control circuit responsive to the signal at said output terminals.

References Cited

UNITED STATES PATENTS

| | | | |
|---|---|---|---|
| 3,308,392 | 3/1967 | McCarter | 330—144 |
| 3,315,223 | 4/1967 | Hibbard et al. | 340—15.5 |

RODNEY D. BENNETT, *Primary Examiner.*

BENJAMIN A. BORCHELT, *Examiner.*

R. M. SKOLNIK, C. E. WANDS, *Assistant Examiners.*